United States Patent [19]

Forster et al.

[11] Patent Number: 4,497,414
[45] Date of Patent: Feb. 5, 1985

[54] MECHANICAL CENTRAL BUFFER COUPLING

[75] Inventors: Hilmar Forster, Wolfenbüttel; Heinz-Georg Wonka, Braunschweig, both of Fed. Rep. of Germany

[73] Assignee: Scharfenbergkupplung GmbH, Fed. Rep. of Germany

[21] Appl. No.: 418,973

[22] Filed: Sep. 16, 1982

[30] Foreign Application Priority Data

Nov. 11, 1981 [DE] Fed. Rep. of Germany ....... 3144730

[51] Int. Cl.³ ............................................... B61G 5/08
[52] U.S. Cl. ........................................ 213/76; 251/212
[58] Field of Search .......................... 213/76; 188/127; 285/25, 63; 251/212

[56] References Cited

U.S. PATENT DOCUMENTS

| | | | |
|---|---|---|---|
| 1,891,659 | 12/1982 | Tomlinson | 213/76 |
| 1,891,660 | 12/1932 | Tomlinson | 213/76 |
| 2,107,218 | 2/1938 | Scharfenberg | 213/76 |
| 2,247,677 | 7/1941 | VanDorn | 213/76 X |
| 3,442,398 | 5/1969 | DiBartolomed | 213/76 |
| 3,556,314 | 1/1971 | Punwani | 213/76 |
| 3,599,665 | 8/1971 | Dwyer | 213/76 X |
| 3,599,803 | 8/1971 | Cope | 213/76 |
| 3,696,941 | 10/1972 | Cope | 213/76 |

Primary Examiner—Randolph Reese
Attorney, Agent, or Firm—McGlew and Tuttle

[57] ABSTRACT

A mechanical central buffer coupling for a so-called model Scharfenberg for rail vehicles which have a main conduit connected to a coupling lock in a brake actuator coupling lock, comprises a controlled pneumatic valve for opening the lock which is characterized by an air valve connected with the main air conduit and to the pneumatic valve. The air valve is connected to the brake actuator so that in case of unintentional severing of the central buffer coupling the air valve actuates the brake of the rail vehicle by venting the main conduit. The model Scharfenberg mechanical central buffer coupling generally includes an arrangement of a rotary pivotable lever system between two mechanical coupling members in such a way that the mechanical coupling members can pivot even without moving the lever system, so as to make possible an actuation of the air-shut off member only upon actuating the releasing device of the coupling members but not heretofore upon an unintentional severing of the coupling members.

10 Claims, 3 Drawing Figures

MECHANICAL CENTRAL BUFFER COUPLING

FIELD AND BACKGROUND OF THE INVENTION

The invention relates in general to couplings and in particular to a new and useful mechanical central buffer coupling, model "Scharfenberg", for rail vehicles whose coupling lock is opened by a controlled pneumatic valve.

In rail vehicles it is known that the main air conduit is in functional connection with the brakes, so that if an unintentional separation occurs in a train formation, automatic braking will occur. In a train formation where the individual vehicles are connected together exclusively by control buffer couplings, the main air conduit is installed to go through in each vehicle from one central buffer coupling to the next and ends therein in an air coupling. Depending on the model of the central buffer coupling, the air conduit can be sealed off mechanically, the air couplings being opened or closed at the same time by mechanical actuation of the coupling locks. This method of closing the air couplings has the disadvantage that in case of unintentional severing, e.g. breakage of a coupling eye, the brakes do not respond.

Further it is known, when the air couplings can be closed manually, that after mechanical connection of the central buffer couplings the air conduits are opened separately. The disadvantage of this is that for coupling as well as for uncoupling the air couplings must be opened or closed separately.

SUMMARY OF THE INVENTION

The invention provides a coupling to vent the main air conduits as a function of the valve which controls the coupling lock. According to the invention the valve is followed by an air valve which is connected with the main air conduit and which in case of unintentional severing of the central buffer coupling actuates the brake of the rail vehicle by venting of the main air conduits.

Accordingly it is an object of the invention to provide a central buffer coupling for rail vehicles which comprises an air valve cylinder having an end face with a bore therethrough and which forms a part of a central buffer coupling. The guide is positioned in the cylinder and has a central hollow portion and an outer ram portion which extends through the end face bore. A piston is movable in the hollow guide and within the cylinder. A compression spring in the cylinder biases the guide toward the end face and the guide has a bevelled end adjacent said end face defining a recess in the cylinder which is vented to the exterior. A main air conduit connects into the cylinder and the guide has a bore therethrough into its hollow interior which communicates with the main air conduit in one position of the guide when the ram portion thereof projects out of the end plate bore. The piston has a portion on the end thereof opposite to the end face which is in sliding engagement with the cylinder and from the engageable portion of the piston with the cylinder to the opposite end of the cylinder as a cylinder chamber which connects to the central buffer coupling.

Accordingly it is an object of the invention to provide an improved central buffer coupling which provides a venting for the main air conduits as a function of a valve which controls the coupling lock.

A further object of the invention is to provide a coupling actuation construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
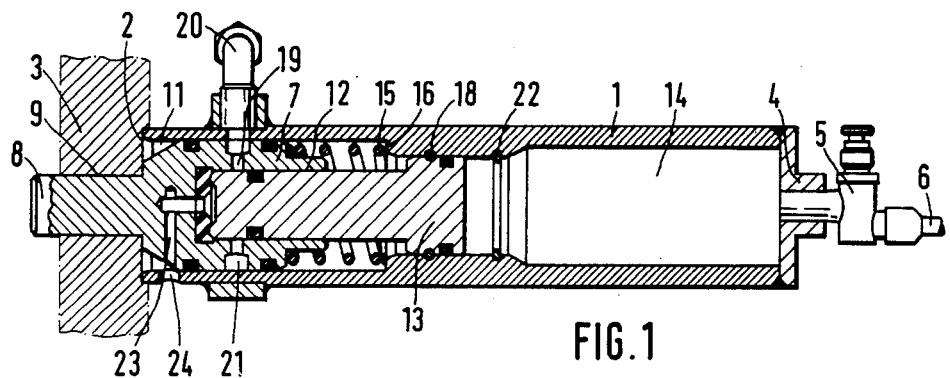
FIG. 1 is an axial sectional view of an air valve with a central buffer coupling shown in the uncoupled position.

Referring to the drawings in particular the invention embodied therein comprises a mechanical central buffer coupling for rail vehicles which includes a main air conduit connected to a coupling lock which is opened by a controlled pneumatic valve which is followed by an air valve which is connected with the main air conduit. The air valve operates in case of an unintentional severing of the central buffer coupling to actuate the brake of the rail vehicle by venting the main conduit.

The air valve comprises a cylinder 1, one end face 2 of which is fastened to the inner side of the end plate 3 of the mechanical central buffer coupling, while its other end face 4 carries a throttle check valve 5 which is connected via a line 6 with the valve not shown for uncoupling the coupling lock of the mechanical central buffer coupling. In cylinder 1, a guide 7 is displaceably mounted, which on one side comprises centrally a ram 8 which is guided with play through a bore 9 in the end face 2 and in the end plate 3 and extends beyond the end plate 3. The shoulder 10 of guide 7, forming the abutment on the end face 2, is formed to slope down and outwardly, so that there exists in the corners of the cylinder 1 a free space 11 all around. Opposite ram 8 the guide 7 has a centered recess 12, in which a piston 13 is mounted displaceably.

With a central buffer coupling uncoupled according to FIG. 1, the valve for uncoupling is closed and the cylinder chamber 14 vented through the throttle check valve 5. To hold the guide 7 in a position so that the ram 8 extends beyond the end plate 3, guide 7 is pressed with its shoulder 10 against the end face 2 by a compression spring 15, which takes support on an abutment 16 on the inner side of cylinder 1. In order to hold piston 13 in the recess 12 secured against movements, a circling groove 17 is provided on the piston, into which there engages a spring ring 18 provided on the inner side of cylinder 1. A bore 19 in guide 7 forms the axial prolongation of the conduit 20 which connects with the main air conduit and opens into the cylinder 1, piston 13 closing the bore 19, so that discharge of air from the main air conduit is impossible. A satisfactory discharge of air from conduit 20 into bore 19, even should guide 7 be twisted in cylinder 1, is ensured in that an annular groove 21 is provided in the outer region of bore 19.

Figure 2:
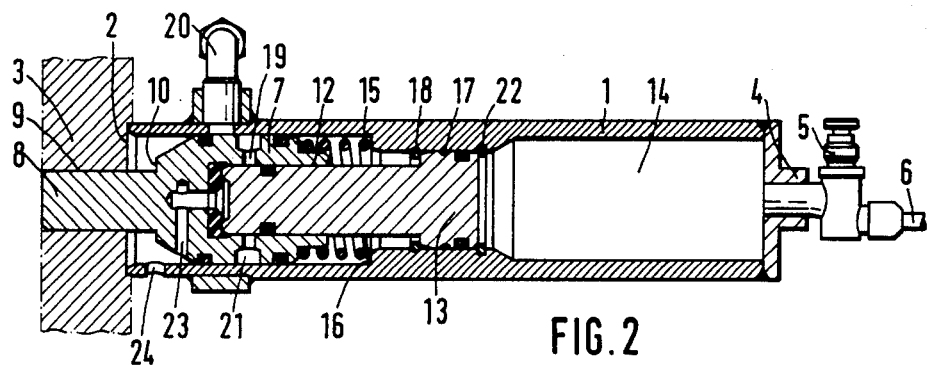
FIG. 2 is a view of the valve with the central buffer couplings engaged.

When coupling the mechanical central buffer coupling according to FIG. 2, by the counter-coupling of the ram 8, guide 7 and piston 13 are pushed back counter to the force of the compression spring 15 and of the spring ring 18, and in this position the piston 13, since the cylinder chamber 14 is vented, is secured against unintentional further displacement into the cylinder chamber 14 by a stop 22. In this position the conduit 20 is covered up by guide 7.

For intentional uncoupling, the valve for uncoupling is opened and the air flows via line 6 and the throttle check valve 5 into the cylinder chamber 14 and thus acts counter to piston 13. With the severing of the couplings, the piston 13 and hence the guide 7 and ram 8 is pushed back by the air into the position ready for coupling according to FIG. 1, and the air contained in the cylinder chamber 14 escapes via the throttle check valve 5.

Figure 3:
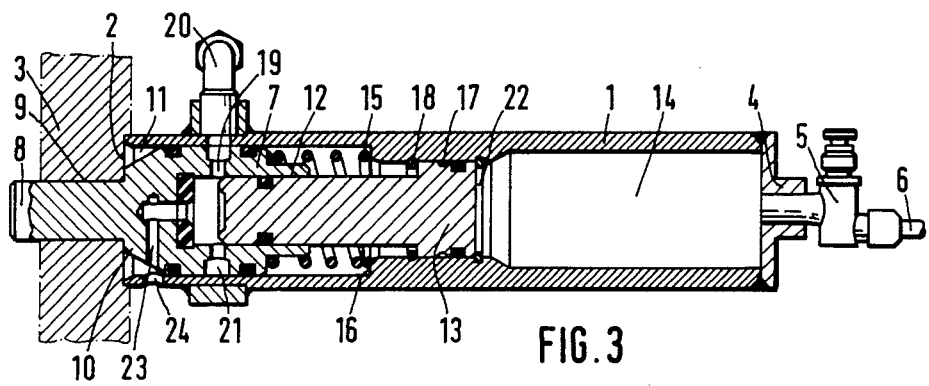
FIG. 3 is a view similar to FIG. 1 with the parts shown in an unintentional severing of the central buffer coupling.

If for example after breaking of a coupling eye an undesired severing of the central buffer couplings occurs, then, as shown in FIG. 3, guide 7 is brought by compression spring 15 into a position according to FIG. 1, while piston 13, since the cylinder chamber 14 is pressureless, remains in its position limited by the spring ring 18 and stop 22. The air can now pass from conduit 20 via bore 19 into the recess 12 between piston 13 and guide 7. As guide 7 has in this region a bore 23 ending in the free space 11, and cylinder 1 has in the region of the free space 11 an opening 24, the air can pass out of the main air pipe to the outside, thereby causing a tightening of the brakes.

While specific embodiments of the invention have been shown and described in detail to illustrate the application of the principles of the invention, it will be understood that the invention may be embodied otherwise without departing from such principles.

What is claimed is:

1. An air valve, for a Scharfenberg type mechanical central buffer coupling arrangement for a rail vehicle having a coupling which is used to form a connection with a cooperating coupling of an adjacent rail vehicle upon movement of the couplings from an uncoupled to a coupled position, and in which arrangement a rail brake influencing main air conduit is provided for connection to a coupling lock in a brake actuator coupling lock for operating the brake of the rail vehicle, such coupling lock having a controlled pneumatic valve for opening the coupling lock, such that said air valve is adapted to be mounted on an end plate of the corresponding coupling and connected with the main air conduit and the pneumatic valve to control the brake actuator coupling lock whereby in the case of an unintentional severing of the connection of the central buffer coupling with that of the adjacent rail vehicle said air valve will actuate the brake of the rail vehicle by venting the main air conduit so as to cause the brake to operate automatically, said air valve comprising a cylinder having a first end and a second end and a wall defining an interior, and being arranged at its first end on a coupling end plate having an end plate opening, an inlet in the cylinder wall adapted for connection with such main air conduit and an outlet in the cylinder wall remote from the inlet for venting air, a guide movable in the cylinder and having a first end provided with a ram portion extending into the end plate opening and movable from an extended ram position protruding from the exterior of the end plate, which corresponds to the uncoupled position of the central buffer coupling, to a retracted ram position not protruding therefrom, which corresponds to the coupled position of the central buffer coupling, and having a second end provided with a reception recess, a piston movable in the cylinder and movable relative to the guide and having a stem portion extending into and displaceable in the reception recess and a head portion forming an air chamber with the cylinder interior, the piston being movable relative to the air chamber from an extended position in which its stem portion is closer to the cylinder first end to a retracted position in which its stem portion is farther from the cylinder first end, and means in the guide defining a closeable vent flow path for flow communicating the cylinder wall inlet with the cylinder wall outlet through the reception recess and arranged such that in the coupled position of the central buffer coupling in which the ram portion is in retracted position, the guide extends into blocking relation with the cylinder inlet so as to keep the vent flow path closed, and in the uncoupled position of the central buffer coupling in which the ram portion is in extended position the guide is positioned out of blocking relation with the cylinder inlet while the piston is in its extended position and extends into the reception recess and into blocking relation with the vent flow path so as to keep the vent flow path closed, and such that upon unintentional severing of the connection of the central buffer coupling, the ram portion moves to its extended position and the guide moves out of blocking relation with the cylinder inlet while the piston remains in its retracted position and is out of blocking relation with the vent flow path so as to open the vent flow path for venting air entering the cylinder inlet from the main air conduit through the vent flow path and the cylinder outlet to the exterior of the air valve.

2. Air valve of claim 1, wherein the guide is hollow and the reception recess is a central recess extending into the guide from the second end thereof, the stem portion of the piston being displaceably positioned in the central recess, the first end of the guide having a bevelled portion closing off said recess at the first end of the guide and terminating in the ram portion, the bevelled portion defining a free space with the adjacent portion of the cylinder interior, the cylinder outlet being positioned in the vicinity of the free space, and the vent flow path including an inlet bore in the guide in the vicinity of the cylinder inlet for flow communicating the cylinder inlet with the central recess and an outlet bore in the bevelled portion for flow communicating the central recess with the free space and the cylinder outlet, the guide inlet bore being closed from flow communication with the cylinder inlet when the ram portion is in its retracted position and also being closed from such flow communication when the piston is in its extended postion, and the guide inlet bore being in open flow communication with the cylinder inlet when the ram portion is in its extended position and the piston is in its retracted position, and the guide outlet bore being in constant open flow communication via the free space with the cylinder outlet.

3. Air valve of claim 2, wherein the guide includes a shoulder portion adjacent to and extending around the ram portion in the vicinity of the bevelled portion, and a compression spring is provided for urging the guide toward the end plate.

4. Air valve of claim 2, wherein a spring ring is disposed in a groove in the interior surface of the cylinder, and the piston is provided with a spring ring engaging transition portion between its stem portion and head portion, and with a spring ring engaging counter groove on its head portion, said spring ring being engageable with the piston at the transition portion when the piston is moved to its retracted position and at the counter groove when the piston is moved to to its extended position, such that the piston may be displaced from its retracted position to its extended position upon applying air to the head portion in the air chamber of the cylinder, and such that the piston may be displaced from its extended position to its retracted position together with the guide upon movement of the ram portion from its extended position to its retracted position.

5. Air valve of claim 1, wherein the second end of the cylinder includes a connection having a throttle check valve adapted for uncoupling the central buffer coupling.

6. Air valve which comprises, an end plate having an opening, a cylinder having a first end and a second end and a wall defining an interior, and being arranged at its first end on the end plate, an inlet in the cylinder wall spaced from the first end and adapted for connection with an air conduit, and an outlet in the cylinder wall adjacent to the first end and spaced from the inlet for venting air, a hollow guide movable in the cylinder and having a first end provided with a ram portion extending into the end plate opening and movable from an extended ram position protruding from the exterior of the end plate to a retracted ram position not protruding therefrom, and having a second end provided with an interior recess, a piston movable in the cylinder and movable relative to the guide and having a stem portion extending into and displaceable in the interior recess and a head portion forming an air chamber with the cylinder interior, the piston being movable relative to the air chamber from an extended position in which its stem portion is closer to the cylinder first end to a retracted position in which its stem portion is farther from the cylinder first end, and means in the guide defining a closeable vent flow path for flow communicating the inlet and outlet through the interior recess, including an inlet bore in the guide in the vicinity of the inlet for flow communicating the inlet with the interior recess and an outlet bore in the guide in the vicinity of the outlet for flow communicating the interior recess with the outlet, said cylinder inlet, cylinder outlet, inlet bore and outlet bore being arranged such that when the ram portion is in retracted position the guide extends into blocking relation with the cylinder inlet so as to keep the vent flow path closed, and when the ram portion is in extended position the guide is positioned out of blocking relation with the cylinder inlet while the piston is in its extended position and extends into the interior recess and into blocking relation with the inlet bore so as to keep the vent flow path closed, and such that upon movement of the ram portion to its extended position and of the guide out of blocking relation with the cylinder inlet while the piston remains in its retracted position and is out of blocking relation with the inlet bore of the guide, the vent flow path will open for venting air entering the cylinder inlet, and passing through the open inlet bore, the interior recess and the outlet bore, via the cylinder outlet to the exterior of the air valve.

7. Air valve of claim 6, wherein the first end of the guide has a bevelled portion closing off the interior recess at the front end of the guide and terminating in the ram portion, the bevelled portion defining a free space with the adjacent portion of the cylinder interior, the cylinder outlet being positioned in the vicinity of the free space, and the outlet bore is in the bevelled portion for flow communicating the interior recess with the free space and the cylinder outlet, the inlet bore being closed from flow communication with the cylinder inlet when the ram portion is in its retracted position and also when the piston is in its extended position, and being in open flow communication with the cylinder inlet when the ram portion is in its extended position and the piston is in its retracted position, and the outlet bore being in constant open flow communication via the free space with the cylinder outlet.

8. Air valve of claim 7, wherein the guide includes a shoulder portion adjacent to and extending around the ram portion in the vicinity of the bevelled portion, and a compression spring is provided for urging the guide towards the end plate.

9. Air valve of claim 7, wherein a spring is disposed in a groove in the interior surface of the cylinder, and the piston is provided with a spring ring engaging transition portion between its stem portion and head portion and with a spring ring engaging countergroove on its head portion, said spring ring being engageable with the piston at the transition portion when the piston is moved to its retracted position and at the countergroove when the piston is moved to its extended position, such that the piston may be displaced from its retracted position to its extended position upon applying air to the head portion in the air chamber of the cylinder, and such that the piston may be displaced from its extended position to its retracted position together with the guide upon movement of the ram portion from its extended position to its retracted position.

10. Air valve of claim 6, wherein the second end of the cylinder includes a connection having a throttle check valve.

* * * * *